(12) United States Patent
Lowery

(10) Patent No.: US 7,207,632 B2
(45) Date of Patent: Apr. 24, 2007

(54) SHIELD SYSTEM FOR COAL MINING

(76) Inventor: Sterling Wayne Lowery, 4860 Sadler Rd., Glen Allen, VA (US) 23060

( * ) Notice: Subject to any disclaimer, the term of this patent is extended or adjusted under 35 U.S.C. 154(b) by 0 days.

(21) Appl. No.: 10/862,254

(22) Filed: Jun. 7, 2004

(65) Prior Publication Data

US 2004/0245845 A1 Dec. 9, 2004

Related U.S. Application Data

(60) Provisional application No. 60/475,974, filed on Jun. 5, 2003.

(51) Int. Cl.
E21C 35/00 (2006.01)
E21D 9/08 (2006.01)

(52) U.S. Cl. .............................. 299/11; 299/30; 299/31; 299/95

(58) Field of Classification Search ................... 299/11, 299/12, 30, 31, 95
See application file for complete search history.

(56) References Cited

U.S. PATENT DOCUMENTS

| | | | |
|---|---|---|---|
| 2,826,402 A | 3/1958 | Alspaugh | |
| 3,497,055 A | 2/1970 | Oslakovic | |
| 3,581,507 A * | 6/1971 | Stevens | 405/145 |
| 3,863,793 A * | 2/1975 | Fujimori | 299/33 |
| 4,307,982 A * | 12/1981 | Nelson | 405/299 |
| 4,312,609 A * | 1/1982 | Culley, Jr. | 405/291 |
| 4,358,224 A * | 11/1982 | Blanpain et al. | 405/298 |
| 4,420,278 A * | 12/1983 | Walker et al. | 405/301 |
| 4,676,697 A * | 6/1987 | Stafford et al. | 405/291 |
| 4,898,496 A * | 2/1990 | Pfeiffer et al. | 405/141 |
| 5,112,111 A | 5/1992 | Addington | |
| 5,232,269 A | 8/1993 | Addington | |
| 5,261,729 A | 11/1993 | Addington | |
| 5,295,734 A * | 3/1994 | Ilomaki | 299/32 |
| 5,306,099 A * | 4/1994 | Mason | 405/299 |
| 5,364,171 A * | 11/1994 | Addington et al. | 299/18 |
| 5,609,397 A | 3/1997 | Marshall | |
| 5,692,807 A | 12/1997 | Zimmerman | |
| 6,220,670 B1 * | 4/2001 | Mraz | 299/18 |
| 6,644,753 B2 | 11/2003 | Mraz | |

* cited by examiner

*Primary Examiner*—John Kreck
(74) *Attorney, Agent, or Firm*—Andrew Befumo

(57) ABSTRACT

A mining system for remotely mining ores and minerals which protects against falling rock and allows evacuation of a miner and conveying system in the case of a cave in. A shield is advanced into a mine. Within the shield, the miner and conveying system are also advanced into the mine independently from the shield. The shield may be used with miners and conveying systems in common use. The cover of the shield protects the miner and conveying system from falling rock. In the event of a cave in, the shield provides a cavity for safely removing the conveying system and miner from the mine.

18 Claims, 12 Drawing Sheets

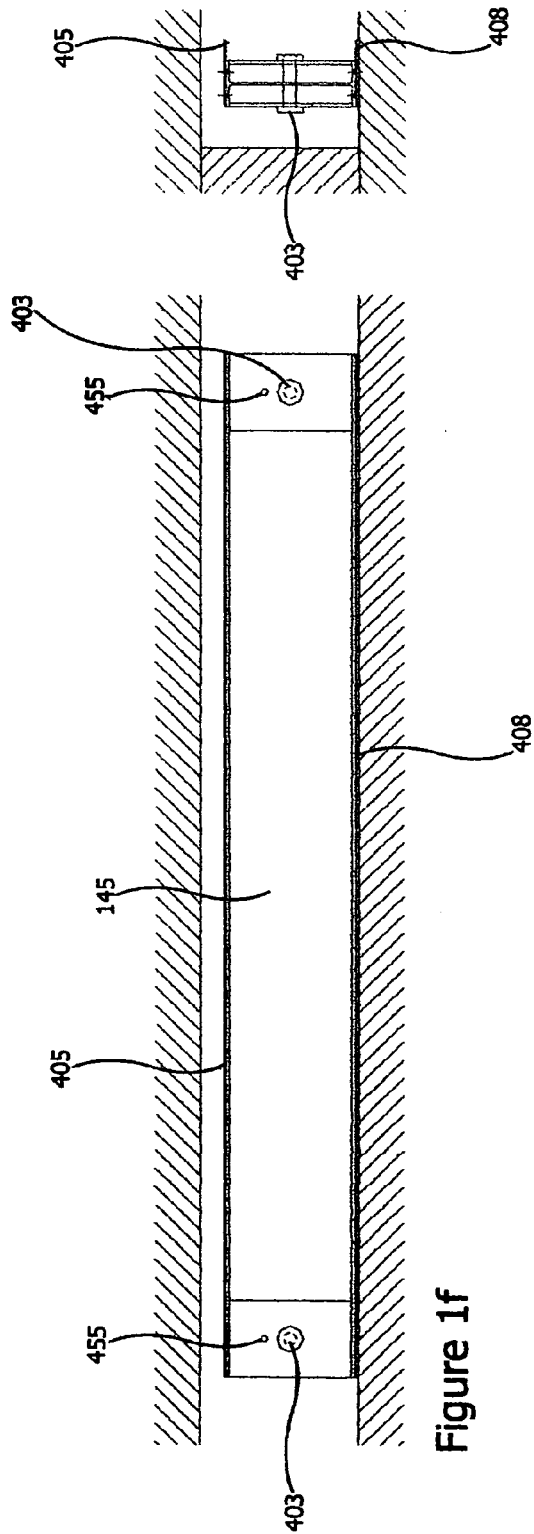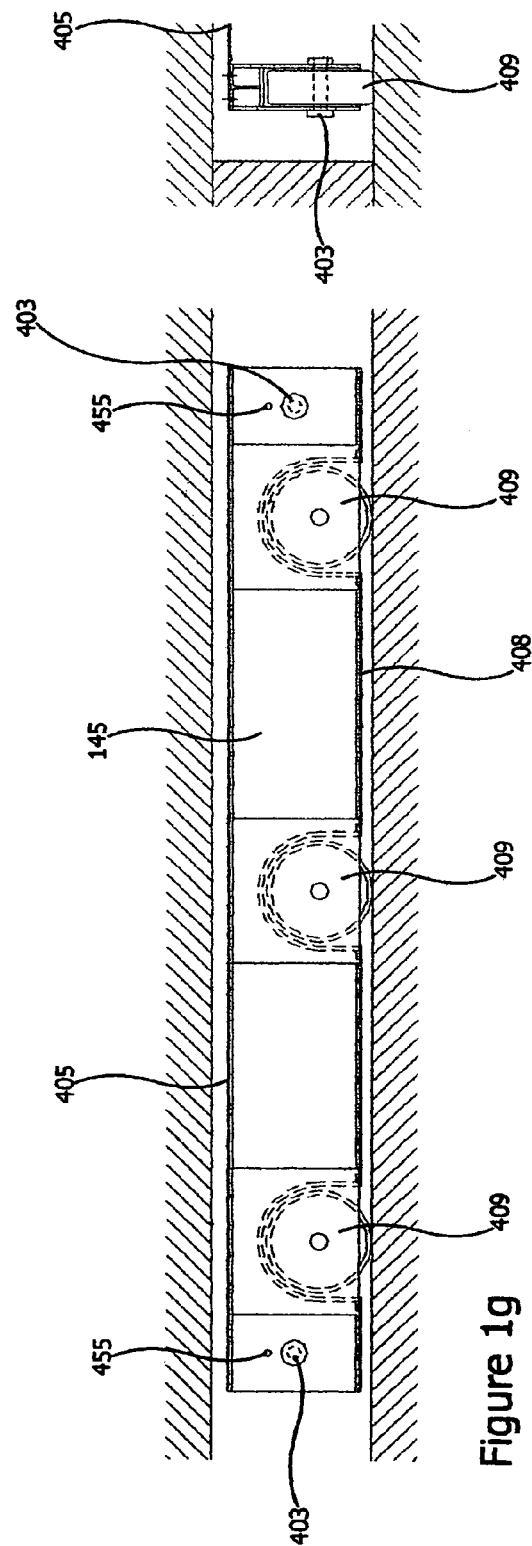
Figure 1f
Figure 1g

SHIELD SYSTEM FOR COAL MINING

CROSS REFERENCE TO RELATED APPLICATIONS

The present application claims priority from U.S. Provisional Application Ser. No. 60/475,974, filed Jun. 5, 2003. The present application is related to copending U.S. patent application Ser. No. 10/862,255, entitled "Platform and Driver for Coal Mining System" and Ser. No. 10/862,255, entitled "Platform and Driver for Coal Mining System" and Ser. No. 10/862,205, entitled "Advancer for Coal Mining System" filed Jun. 7, 2004, both herein incorporated by reference in their entirety.

FIELD OF THE INVENTION

The invention is generally related to an improved system for coal mining. More particularly, the invention is directed to a shield system for high wall mining.

DESCRIPTION OF RELATED ART

Highwall mining is generally a method of mining whereby a remote controlled continuous miner is sent into a face of coal, or other ore, from an outside bench to mine or cut such ore out from under the overburden above. The continuous miner will generally cut out the ore in widths ranging from six to twelve feet in width and up to fourteen feet in height, depending on the size of miner used. As the miner is remotely controlled from outside into the ore, units for transferring the mined ore, called "cars" or "beams," are sequentially sent into the mine, forming a continuous train and transferring the ore from car to car to the outside bench. Various methods are incorporated into the units for transferring the ore, including conveyors, chains and screws. Likewise various methods are used to power the transferring units, including electrical, hydraulics and/or mechanical drive shafts. The cars or beams are generally either coupled or pinned together, allowing some degree of deflection between them to improve negotiation of the rough surface in the mine.

On the outside of the mine, a launch platform is positioned to receive the transferred material as it is discharged from the rear car or beam and direct it either to a truck or stockpile via belt conveyors and/or chain conveyors. The launch platform also acts as a staging area to insert and retrieve the cars as needed and also act as a drive station to either hydraulically, electrically or mechanically drive or push the cars into the mine.

A major problem confronting the systems used today is roof material falling onto the transfer units and/or the miner and entrapping them. There are approximately forty systems operating today and most, if not all, have incurred major roof falls and entrapment requiring extensive downtime and cost to retrieve. Because of the complexity of the transfer units and continuous miners, it is critical to avoid damage or a complete loss of either. The transfer units range in length today from 20' to 40' and the systems include enough units to remotely drive the miner into the ore to depths of over 1000 feet; thus, as many as 50 units could be inside a mine at the time of a cave in, causing significant loss. Even if the units and miner are recoverable, significant work must be undertaken to recover them. A permit has to be issued to send men into an adjacent hole, mining, roof bolting and carrying ventilation back until they can cut through and cross-over to hopefully retrieve the miner and as many transfer units as possible. A number of units have been deemed a total loss and left under the mountain as the cost was to high to go after the units.

Additional roof problems are created by not controlling the direction of the miner precisely as it is driven into the mine. If the miner is not steered properly, the pillar or rib in between two mines can be cut. When the system cuts through the pillar exposing the width of two cuts, which can be as much as twelve feet in width each, twenty feet or more of unsupported roof is exposed. This greatly increases the potential for major roof falls, thus increasing the potential for entrapment.

Systems commonly used today require significant force to push the transfer units and miner into particularly deep mines. In deep mines, this force often causes the cars to buckle up and down throughout the hole binding the cars into the roof and floor. Because of this, the depth to which they can be pushed is limited.

Current disclosed methods of remote mining in ore deposits such as coal generally employ a mining machine that excavates mine openings to some distance from the seam exposure on the surface and a system for conveying the mined ore to the surface. In most of the present systems, the system for conveying consists of multiple conveyors or screws which are advanced into the mine openings from the surface. U.S. Pat. Nos. 6,644,753 and 6,220,670 issued to Mraz disclose a method and apparatus for mining of aggregate material from a seam which includes a mining apparatus and a self-propelled conveyor capable of advancing or retreating in the seam on its own power and an advancing and steering arrangement for the mining apparatus.

U.S. Pat. Nos. 5,112,111, 5,232,269, 5,261,729 and 5,364,171 to Addington et al. disclose an assembly of conveyors and a mining machine advanced into the seam without interrupting the flow of aggregate material by separate means designed to pull at the forward end and push at the rearward end. Similarly, U.S. Pat. No. 5,609,397 to Marshall et al. discloses an assembly of conveyors interconnected with a mining machine and a driving device located outside the seam and consisting of rack and pinion or, alternately, reciprocating cylinders, linear tracks, linear or rotary drives, chains, cables or other mechanical devices. U.S. Pat. No. 5,692,807 to Zimmerman discloses a guidance assembly for extending and retracting an assembly of conveyors into and out of the seam. U.S. Pat. No. 3,497,055 to Oslakovic et al. discloses a multi-unit train of conveyors having a self-propelled unit at each end coupled to intermediate units, each end unit being capable of towing the intermediate units. U.S. Pat. No. 2,826,402 to Alspaugh et al. discloses a train of wheeled conveyor sections pulled into the mine opening and pushed out of it by a self-propelled mining machine. Buckling of the train is avoided by the grooves made by the mining machine in the floor, said grooves spaced the same distance as the treads of the wheels carrying the conveyor sections.

At present, the miner and material transfer units while operating underground are subject to roof falls and possible entrapment. Severe falls have caused both the continuous miner and material transfer units to be left underground and abandoned. Insurance costs have risen significantly to cover risk associated with possible loss due to rock falls.

Accordingly, it is an object of the present invention to provide a system for protecting a miner from falling rocks within a mine.

It is an object of this invention to provide a system for protecting material transfer units from falling rocks within a mine.

It is another object of the present invention to provide a system for removing a miner and/or material transfer units from within a mine in the event they become entrapped.

It is another object of the present invention to provide an improved mining system which reduces or eliminates down time caused by falling rocks or cave-ins.

It is a further object of the present invention to provide an improved mining system which provides increased control of the transfer units at greater mine depths.

It is yet a further object of the present invention to provide an improved mining system which provides greater directional control of the miner and material transfer units.

Finally, it is an object of the present invention to accomplish the foregoing objectives in a safe and cost effective manner.

SUMMARY OF THE INVENTION

A shielded mining system for mining ores and minerals remotely and removing the mined ores and minerals from the mine includes a miner, at least one material transfer unit for transporting the mined ores and minerals from the mine and shield having two side surfaces and a top surface. The shield may have a bottom surface which is flat or on wheels, depending on the floor of the mine. The shield provides protection to the miner and/or material transfer unit in a manner such that the miner and/or the material transfer unit can advance or retreat independently from the shield. The shield is advanced into the mine using electrical power, battery power, hydraulic power, a winch system or other appropriate means. Multiple shields may be connected together by, for example, a hook and pin system, so that a protected pathway is formed. Any material transfer unit such as multiple conveyor cars, a single winched car, a continuous belt system or other appropriate transport unit can be used. If multiple cars are used, they can be hooked together by, for example, a hook and pin system as well.

In a preferred embodiment of the present invention at least one shield in the shield system includes an advancing means. When the shield system is being pushed into a mine by an external platform/driver, having an advancing means on a forward shield keeps the shield system from buckling, and aids in pushing and steering the miner into the mine.

A method for remotely mining ores and minerals and for removing the mined ores and minerals from the mine, includes advancing a miner into a mine and independently advancing a first shield into the mine to protect the sides and top of the miner. A conveying system for conveying the mined ores and minerals is advanced into the mine and a second shield, preferably connected to the first shield, is independently advanced into the mine to protect the sides and top of the conveying system. Ores and/or minerals are excavated from the mine using the miner and removed from the mine using the conveying system. The conveying system may include supports which support the roof of the second shield

BRIEF DESCRIPTION OF THE DRAWINGS

FIG. 1b is an exploded view of FIG. 1a;

FIGS. 1f and 1g are side views of the present invention showing alternate means for moving the shield along the floor of the mine;

FIG. 3 is a cross sectional side view of one side of a self advancing shield of the present invention with all cylinders in retracted position;

ELEMENT LIST

Figure 1:
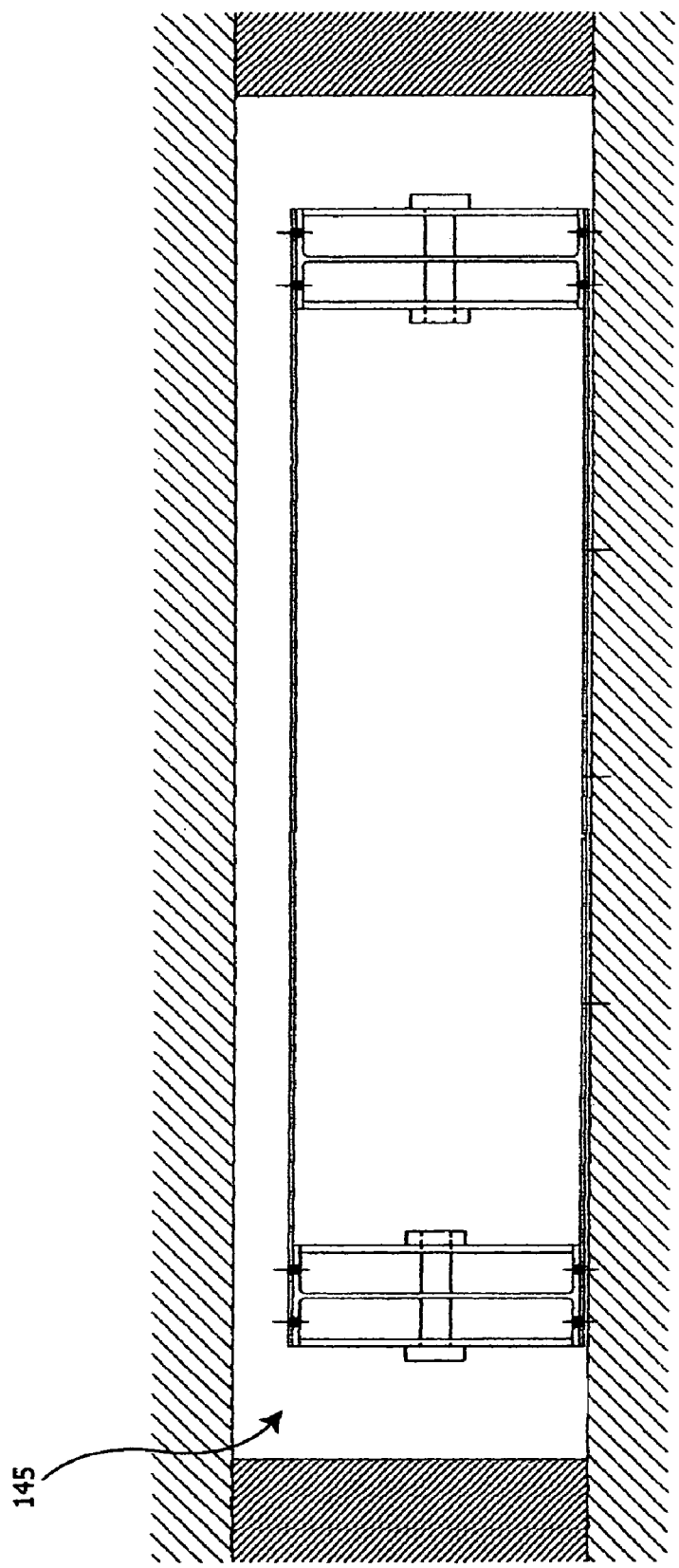
FIG. 1 is an end view of the preferred embodiment of the present invention.

145 Shield
401 Side supports of shield
403 Connecting pin for shield
405 Top plate of shield
408 Bottom plate of shield
409 Wheels
411 Mine floor
414 Mine roof
430 Side frame of truss
433 Top belt rollers
435 Bottom belt return roller
437 Top (carry) belt
439 Bottom (return) belt
441 Pin
443 Wheel roller
445 Spring (upwardly biased)
447 Roller guides (belt alignment)
450 Head pulley
451 Tail pulley
453 Hook
455 Keeper pin
501 Material transfer unit
503 Shuttle car on wheels 504 Movable transfer floor
505 Tire/wheel
507 Roller guides
508 Cable carriers
509 Rail
510 Rope guide
511 Railroad wheels
512 Non-movable floor
513 Wire
514 Opening
550 Continuous belt transfer unit

DETAILED DESCRIPTION OF THE PREFERRED EMBODIMENT

Referring now to the drawings, FIGS. 1, 1a, 1b, 1c, 1d, 1e, 1f, 1g, 2, 2a, 2b, 2c and 3 show several embodiments of the present invention. As shown, the invention can be used with different types of material transfer unit, all independent and capable of being extracted from within the shield 145 in event of roof fall. Examples of several types of material transfer units are shown in the drawings and described below; however, these are not intended to be the only types of material transfer units which would be used with the present invention.

FIG. 1 shows an end view of the shield 145 without any material transfer unit within.

Figure 1A:
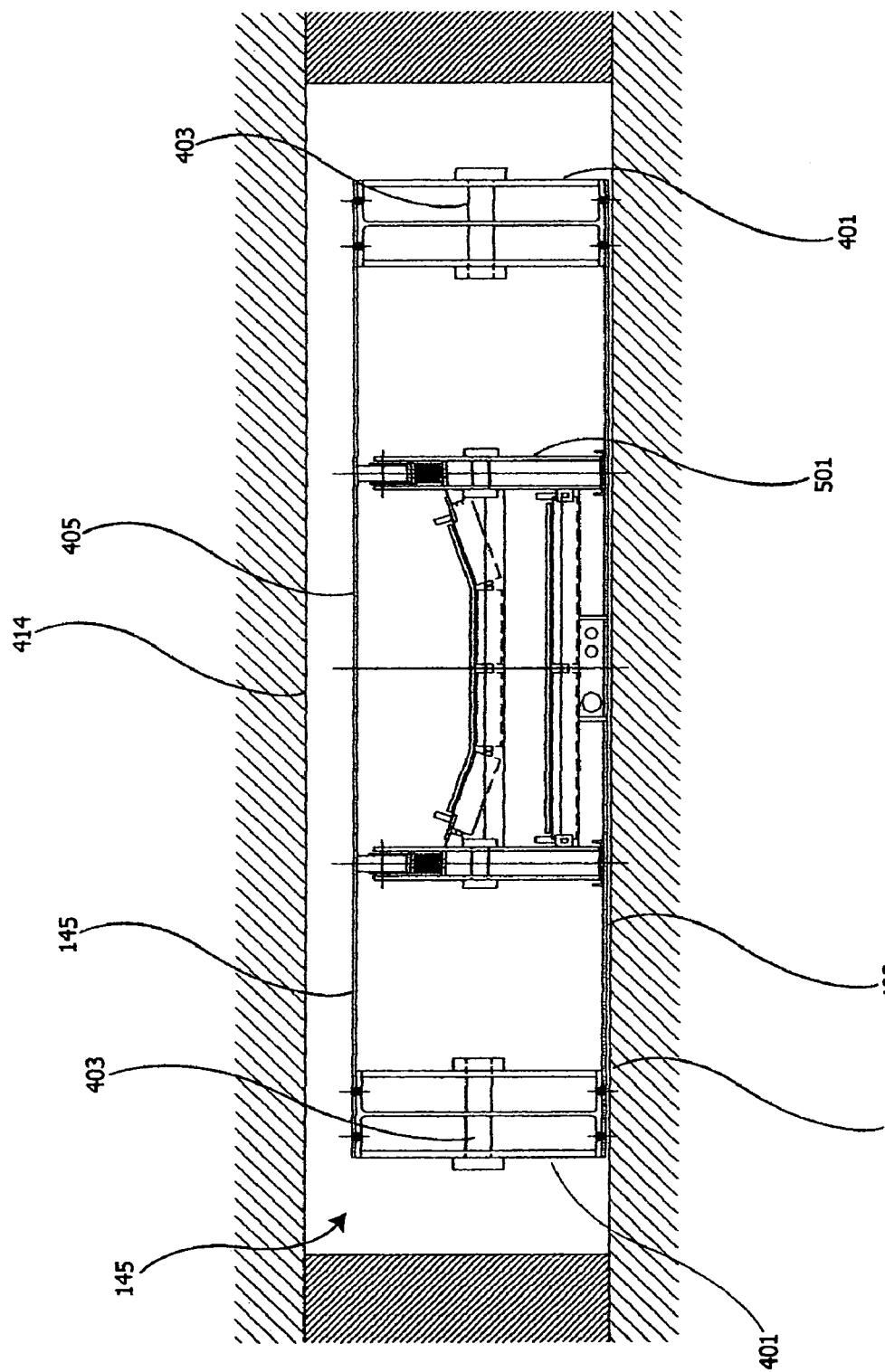
FIG. 1a is an end view of the preferred embodiment of the present invention with one type of material transfer unit inside.

FIG. 1a shows an end view of a shield 145 with one type of material transfer unit 501, a piggyback truss conveyor enclosed. The material transfer unit 501 is totally independent from the shield 145 and multiple conveyors may be hooked or tied together independent from the shield 145 so they can be extracted from within the shield 145. FIG. 1a shows the top plate 405 of the shield, the bottom plate 408 of the shield 145, the mine floor 411, the mine roof 414, the side supports 401 of the shield, and the side support connecting pins 403 which can accept a hook 453 from another shield in order to connect multiple shields. Prior to insertion, when handling the shield 145 and material transfer unit 501 outside the mine, a temporary pin, or other appropriate apparatus, can be used to hold the material transfer unit 501 inside the shield 145. Once the shield 145 and material transfer unit are ready to proceed into the mine, the pin can be removed.

Figure 1B:
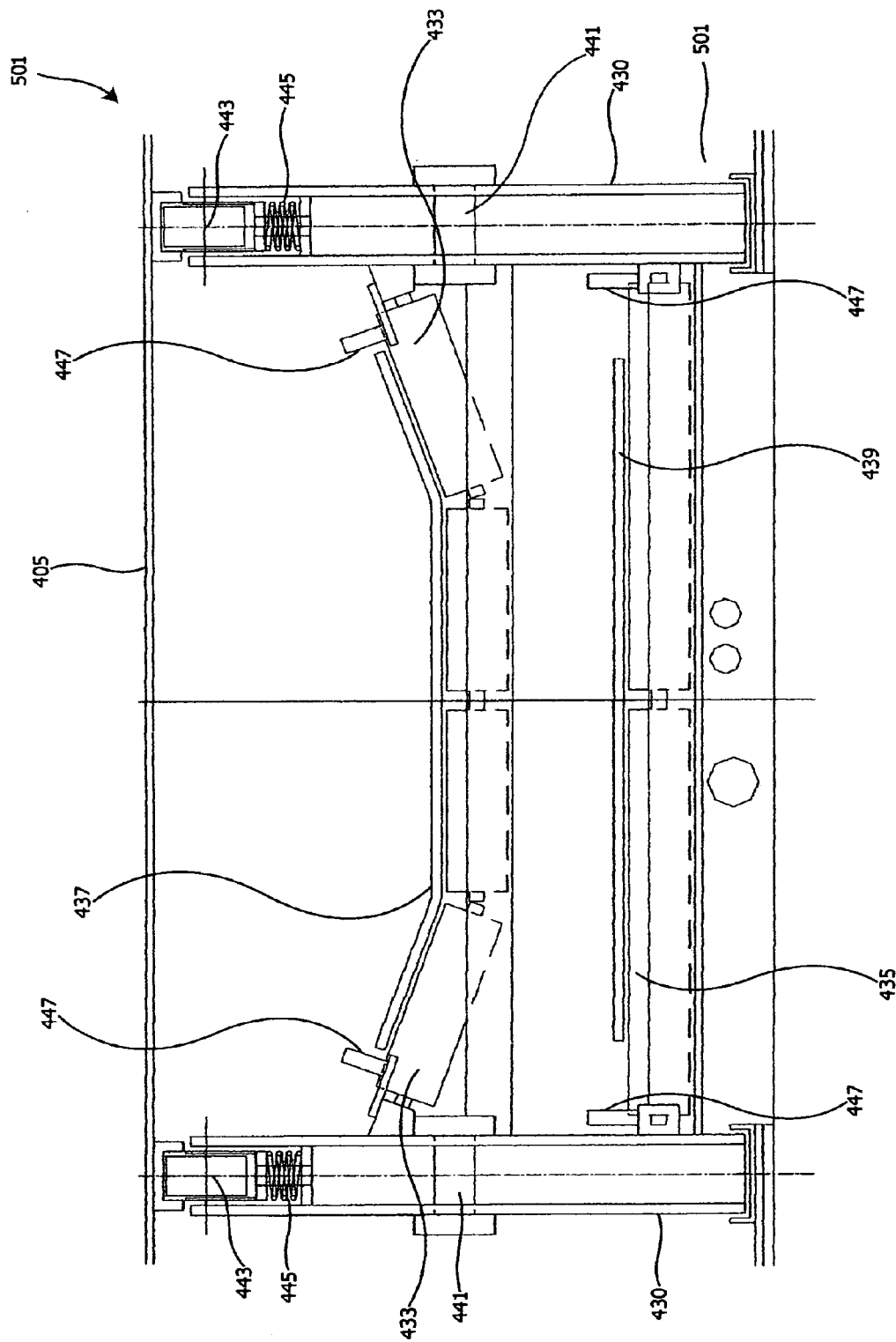

FIG. 1b shows an exploded cross-sectional end view of the piggy-back truss conveyor type of material transfer unit 501 showing greater detail of the components including the truss side frame 430 which is a structure to support the conveyor independent of the shield 145, the top belt rollers 433 to support the conveyor belt 437 carrying the material, the bottom belt rollers 435 to support the return belt 439, roller guides 447 to keep the belt 437 & 439 in alignment. Wheel rollers 443 are supported by heavy-duty springs 445 to help support the roof 405 as the material transfer unit 501 is pulled out from within the shield 145 in the event of a roof fall and subsequent extraction. The units 501 are preferably hooked together by placing a hook 453 over a pin 441.

Figure 1C:
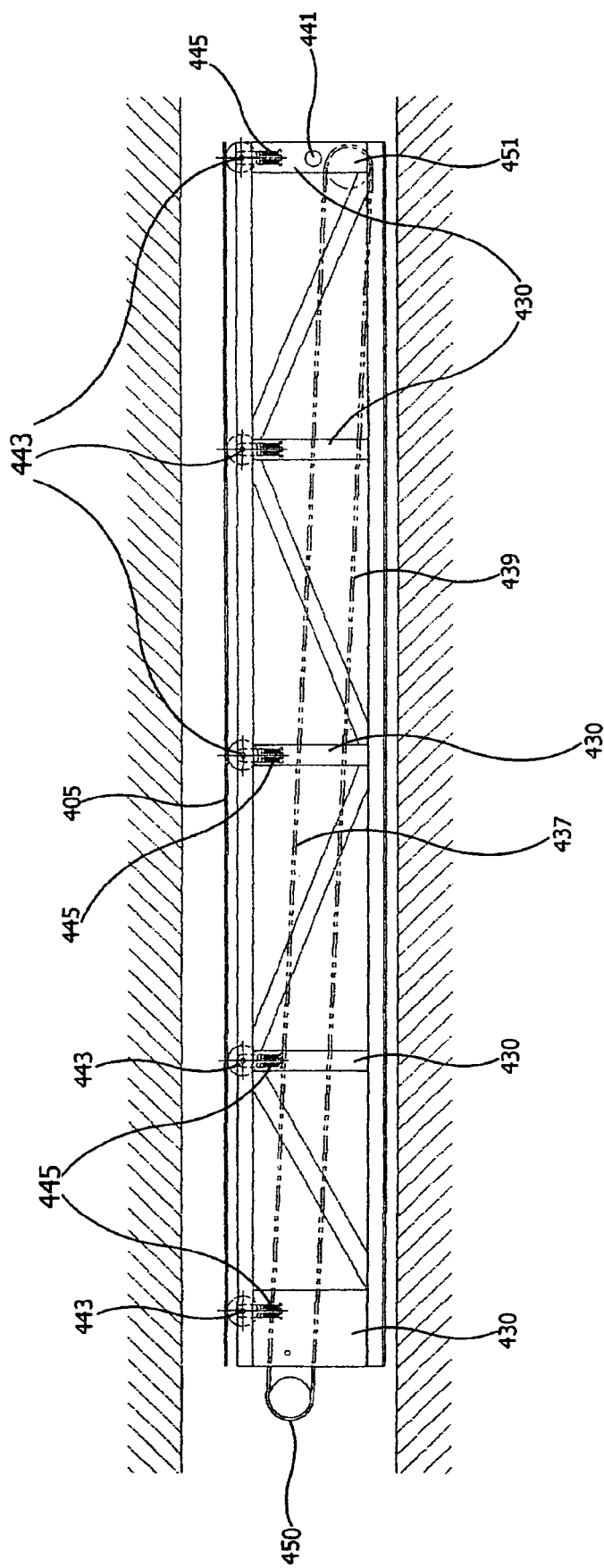
FIG. 1c is a side view of the preferred embodiment of the present invention with one type of material transfer unit inside.

FIG. 1c shows a cross-sectional side view of the unit 501 with head pulley 450 and tail pulley 451 shown. The unit 501 is shown clearly situated within the shield 145 such that the shield 145 provides protection against rocks falling from the roof 414 of the mine and provides a cavity for withdrawing the unit 501 from the mine in the event of a roof cave in.

Figure 1D:
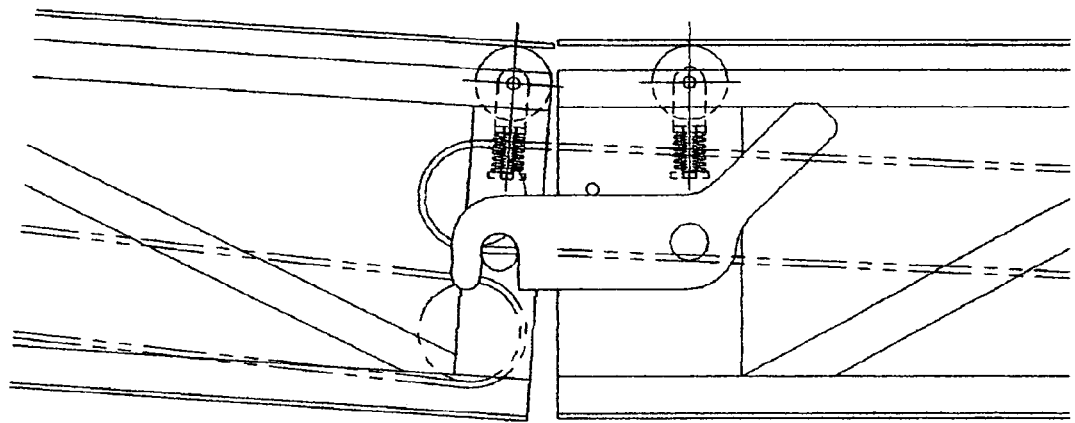
FIGS. 1d and 1e are side views of the preferred embodiment of the present invention with one type of material transfer unit inside.
Figure 1E:
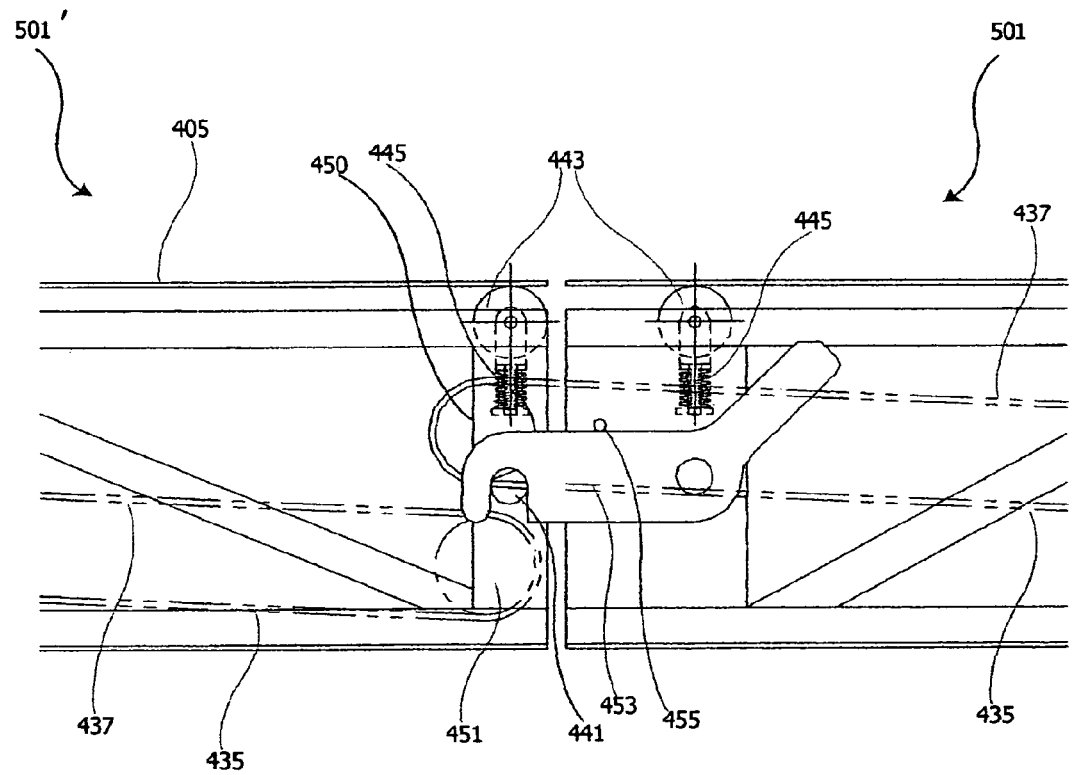

FIGS. 1d and 1e show the preferred means for connecting multiple units 501. A connecting arm 453 from a first unit 501 fits over a pin 441 on a second unit 501', connecting the end of the first unit 501 to the second unit 501' and a keeper pin 455 is inserted above the connecting arm 453 to keep the arm 453 from rising off the pin 441.

FIG. 1d further shows how the preferred connection allows for an angle of deflection between the ends of two units 501 and 501' so the shield 145 and connected units 501 & 501' within can negotiate over a rolling mine floor 411.

As shown in FIGS. 1f and 1g, the shield 145 may be constructed with a substantially flat bottom 408 or may include wheels 409 if the mine floor 411 conditions allow. By using wheels 409, the force required to drive the shield 145 into the mine is reduced. Any bottom design which would allow the shield 145 to move through the mine is acceptable. A keeper pin 455 can be used to ensure that a hook (not shown) is retained on the connecting pin 403 when multiple shields 145 are connected.

Figure 2:
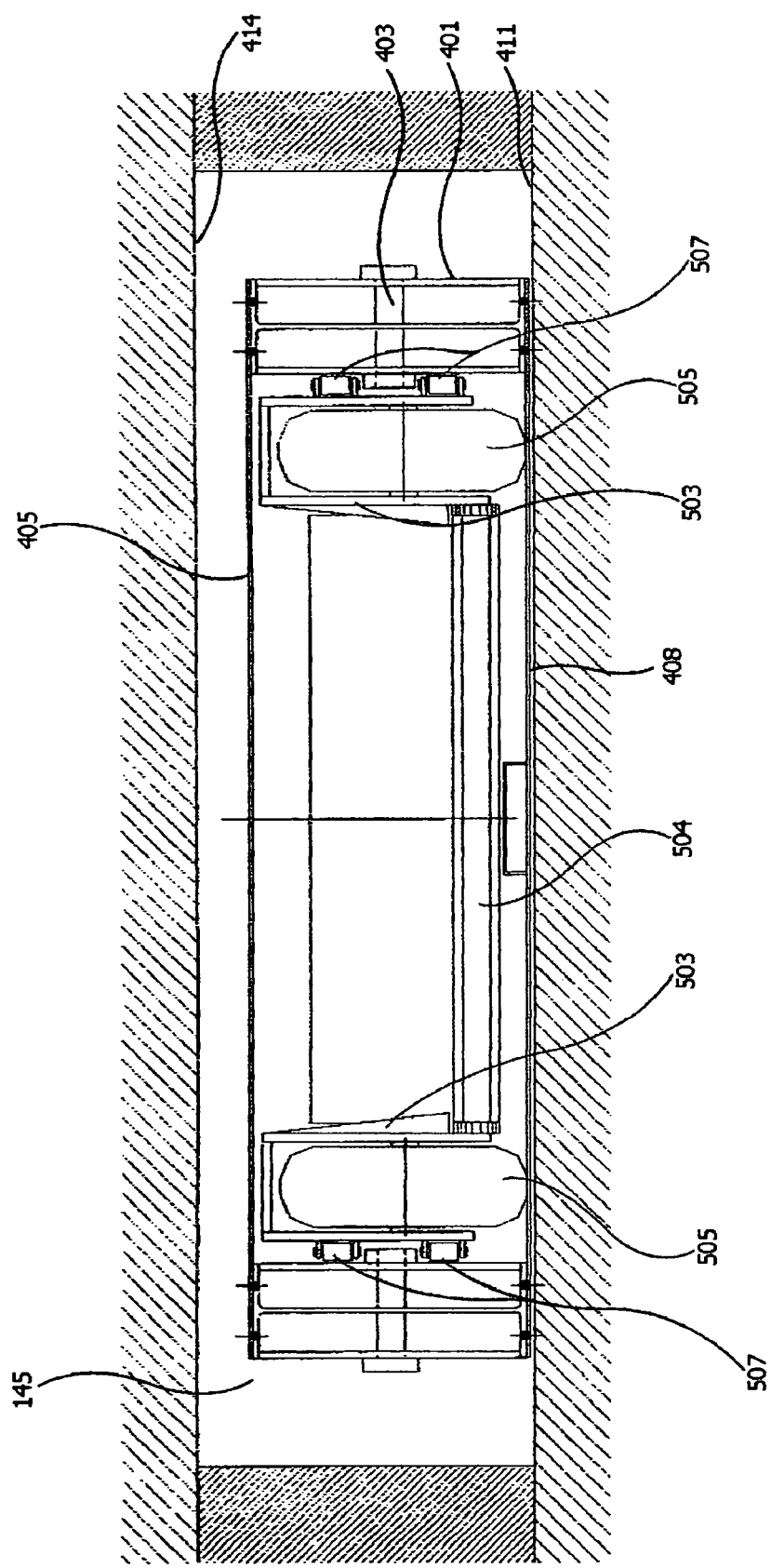
FIG. 2 is an end view of the present invention with one type of material transfer unit inside traveling on wheels.
Figure 2A:
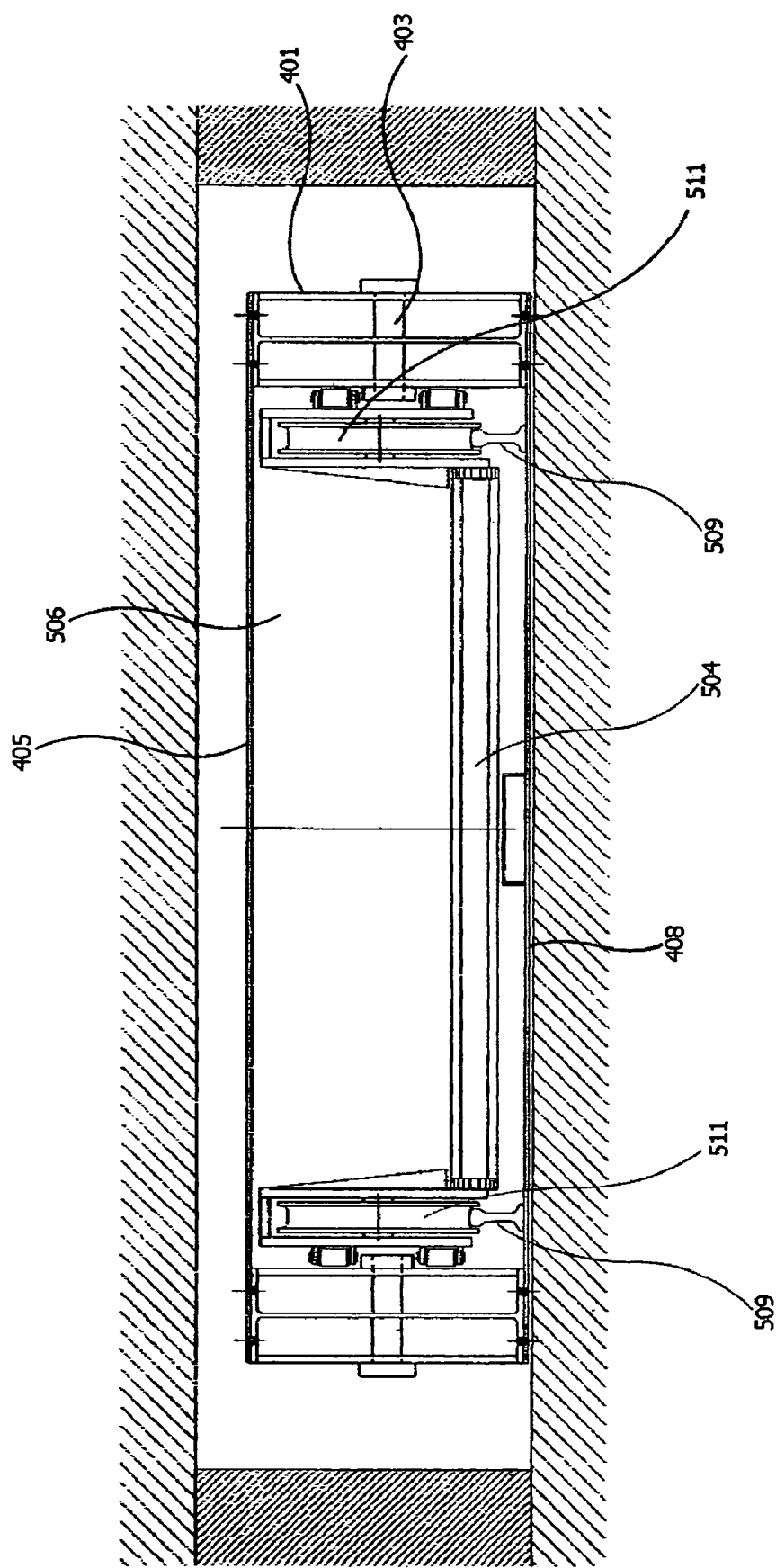
FIG. 2a is an end view of the present invention with one type of material transfer unit inside traveling on rails.

FIG. 2 shows another type of material transfer unit that can be operated independently within the shield 145, a shuttle car on wheels 503. The shuttle car 503 can be electrically powered, battery powered or winched in and out carrying various amounts of ore tonnage depending on capacity. The floor 504 of the shuttle car 503 can be a moving floor using a chain or a belt and can be discharged out the rear onto a cross conveyor or onto a belly conveyor once on a platform. Rollers 507 will hold the car 503 and guide it through the shield 145 as it is powered or winched in and out. The shuttle car on wheels 503 can either run on rubber tire wheels 505 or on railroad type wheels 511 riding on rails 509 as shown in FIGS. 2 and 2a, respectively.

Figure 2B:
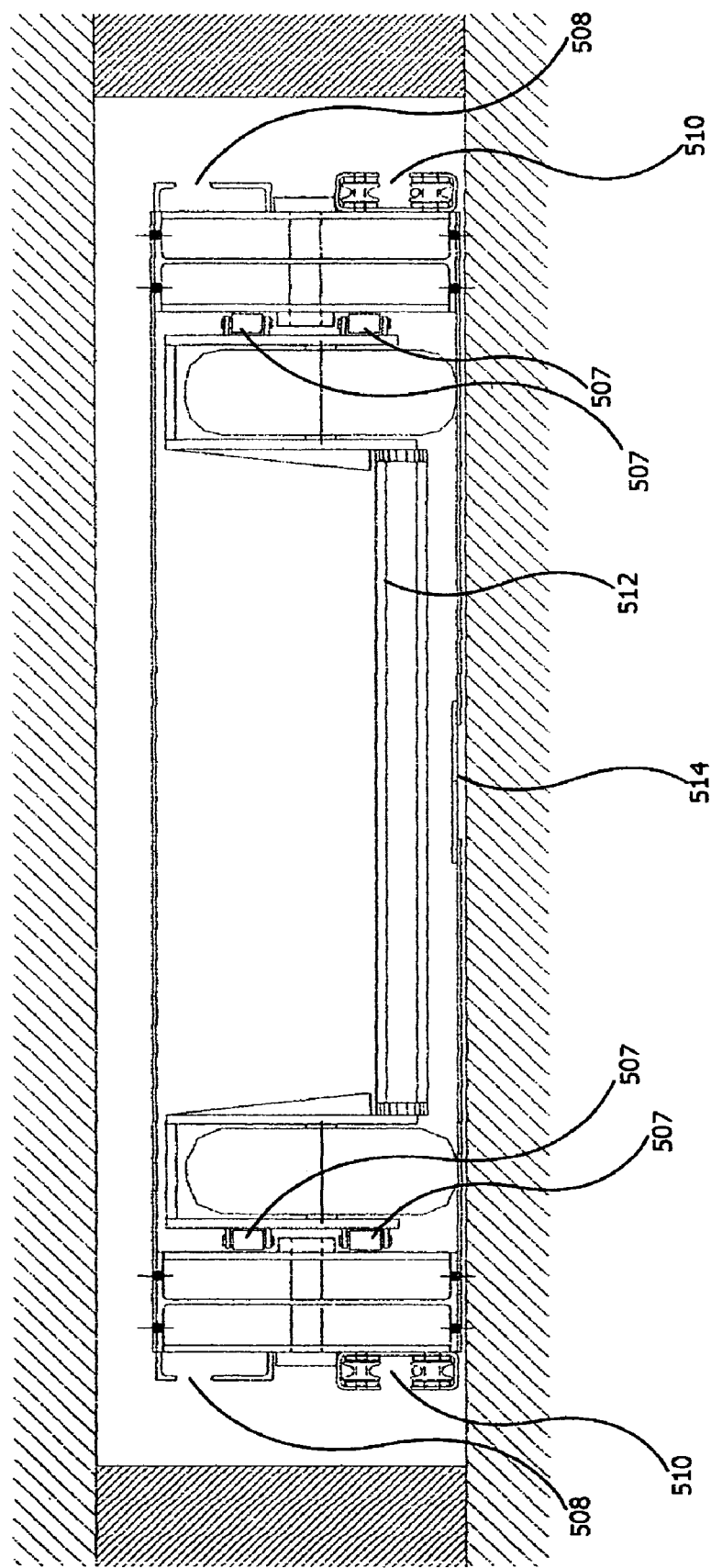
FIG. 2b is an end view of an alternate embodiment of the present invention with one type of material transfer unit traveling inside on wheels pulled in and out by winch ropes.

FIG. 2b shows a shuttle car on wheels 503 with a non-movable floor 512 that can be emptied once on a platform by a blade driving along the length of the car 503 which blade ejects or pushes the mined material off the rear of the car 503 onto a cross conveyor at the rear of the platform or onto a belly conveyor in the platform. The blade can be attached to driver/puller arms described in co-pending U.S. patent application Ser. No. 10/862,255, entitled "Platform And Driver For Coal Mining System". FIG. 2b also shows cable trey carriers 508 on either side of the shield 145 to carry a miner cable, water hose and control cable. Winch rope guides 510 are located on either side of the shield 145. These guides 510 carry a wire rope 513 that runs up through sheaves close to the miner and returns back to the rear of the shuttle car 503 to pull it into the mine and up to the rear of miner so that ore may be off-loaded onto the car 503. An opening 514 with rubber or other material to close once winch rope has passed through, allows a winch rope to brought up from under or from the side of the shield 145 when inserting the shield 145 into the push area without stopping an ongoing cycle; thus a shield 145 can be inserted into the line of shields and hooked up while the shuttle car 503 is inside being loaded and there is no loss of time between cycles.

Figure 2C:
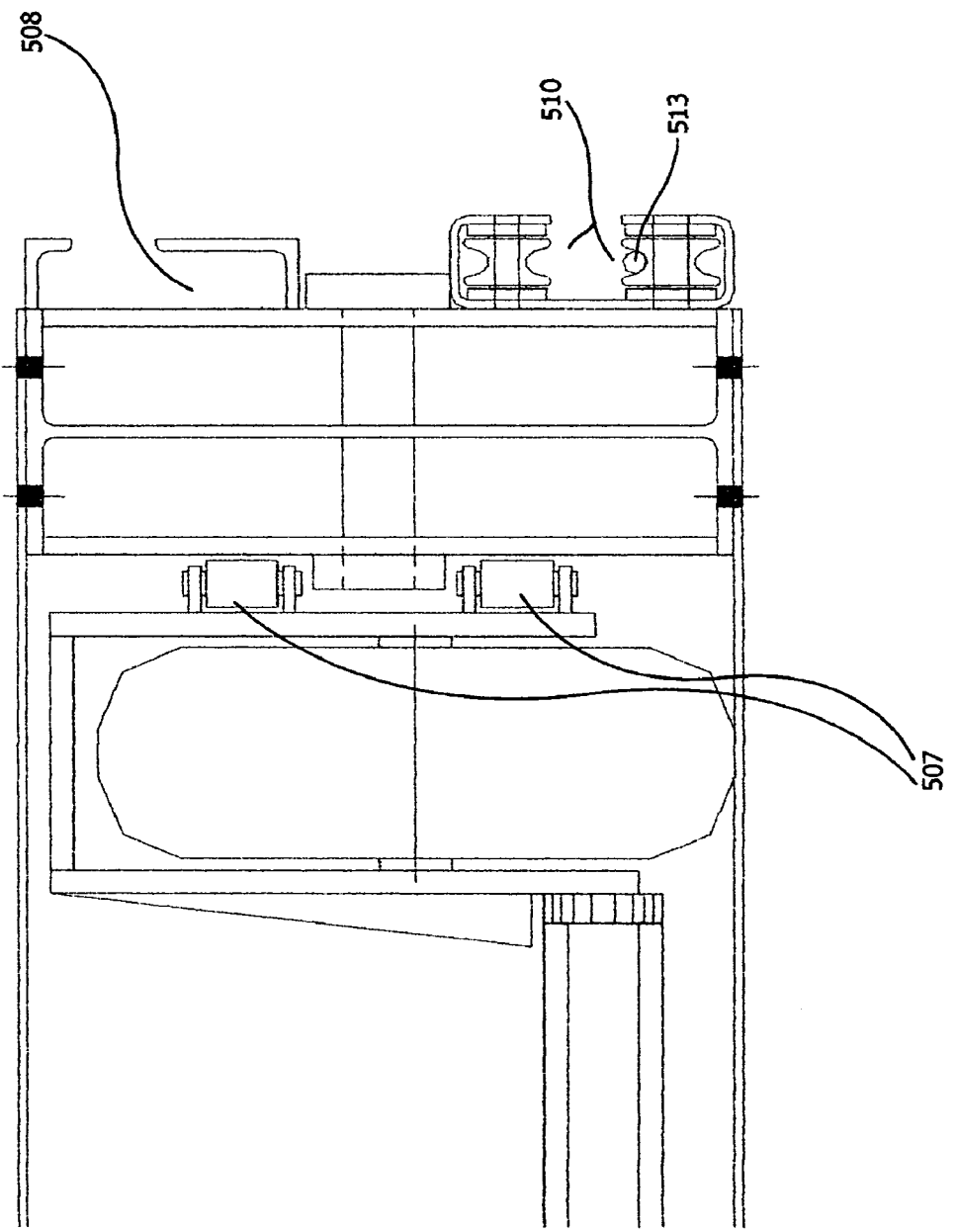
FIG. 2c is an exploded view of the alternate embodiment of the present invention shown in FIG. 2b.
Figure 7:
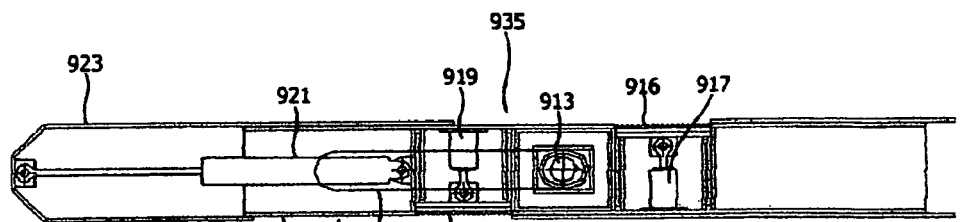
FIG. 7 is a cross sectional side view of one side of a self advancing shield of the present invention with gripping means fully retracted and ready for advancing means to retract pulling the inner beam forward.
Figure 6:
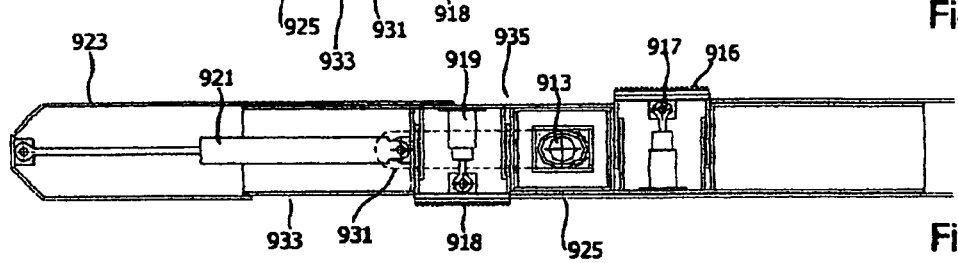
FIG. 6 is a cross sectional side view of one side of a self advancing shield of the present invention with gripping means extended and outer beam extended the full stroke of the advancing means.

FIG. 2c is an exploded view of the shield 145 side supports 401 showing wire rope 513 riding in winch rope guides 510.

Figure 3:
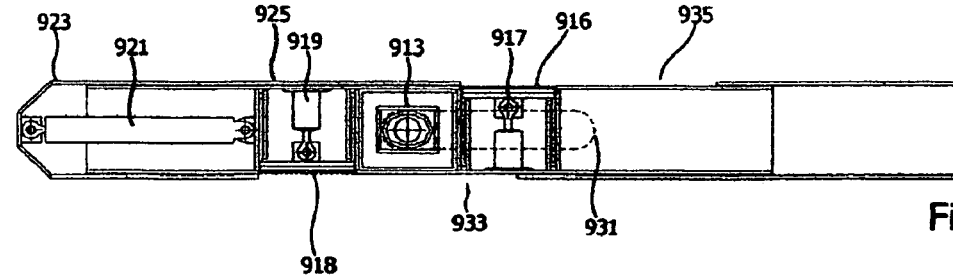
FIG. 3 is an end view of the present invention showing an alternate material transfer unit within.
Figure 8:
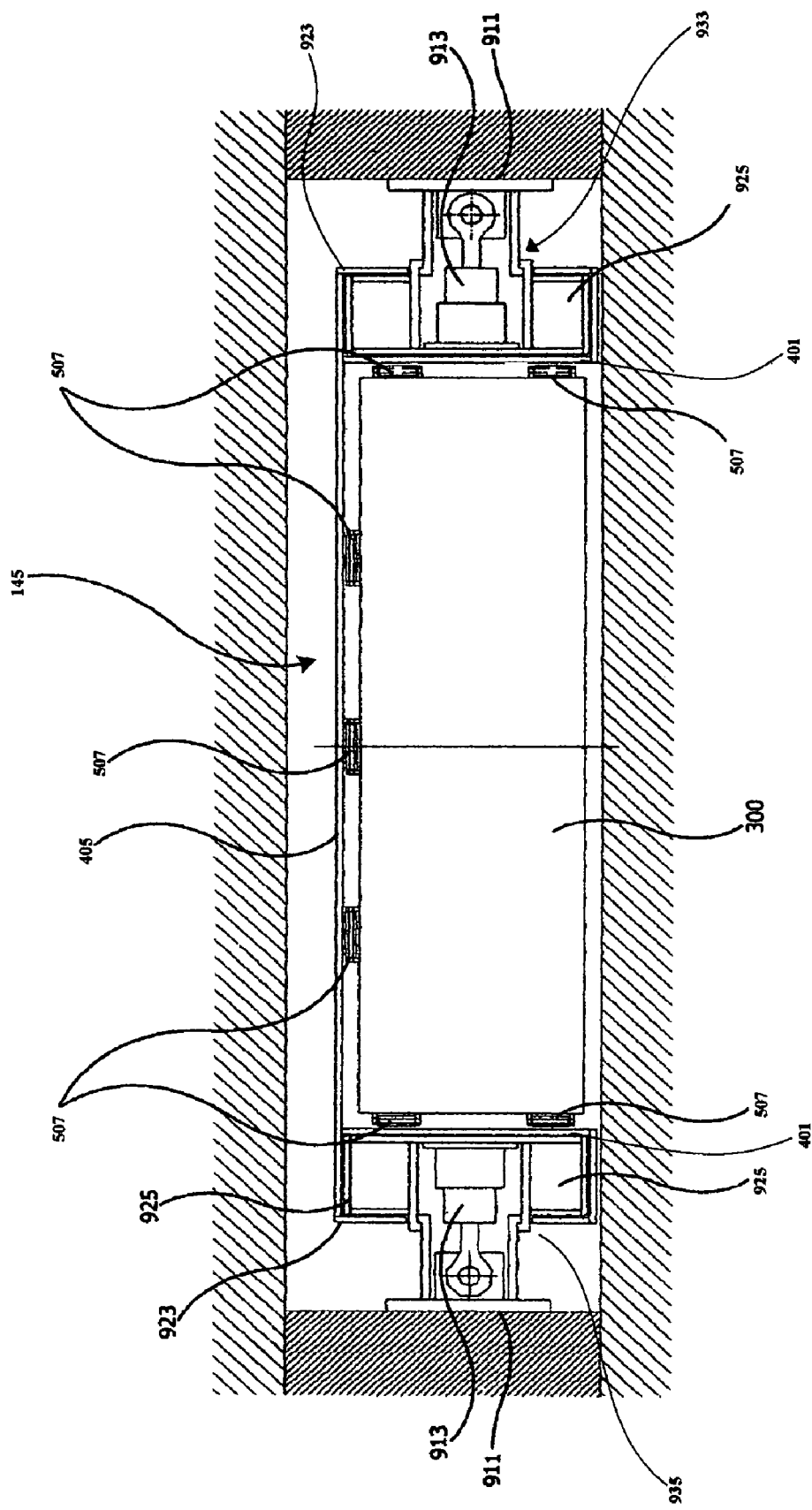
FIG. 8 is a cross sectional view of a self advancing shield of the present invention wherein the actuating means is in an extended position.

FIG. 3 shows yet another type of material transfer unit that can be used within the shield 145. A continuous belt 550, using a belt storage magazine feeding the belt 550 from the platform, is driven by means of a drive located on the platform. A tail pulley is attached behind the miner, or the second shield, and the conveyor belt 550 is fed in as the miner advances. When the shields 145 are lowered over the continuous belt 550, the conveyor truss is split and pulled to either side as shown in FIG. 3. Once the belt 550 is in place, the truss sides are closed and are centered around the belt to form the support for the belt 550 such that mined material can be transported out of the mine on the belt 550. The bottom of the truss structure has plates which, when closed, fill in the void in the bottom opened to allow the shielded car to be lowered from the top. Inserting a shield 145 over the top of the continuous belt 550 will not stop the train of shields 145 from advancing forward during the lowering of additional shields 145 and the hooking of the shielded cars 145 from one to another, thus there is no work stoppage. The tail pulley structure attached to the miner and the independent truss frames hooked together can be pulled out from within and is structurally strong enough to pull the miner out from within the shields 145 if needed. Likewise a continuous chain driven from outside could transfer the material to the outside.

Figure 5:
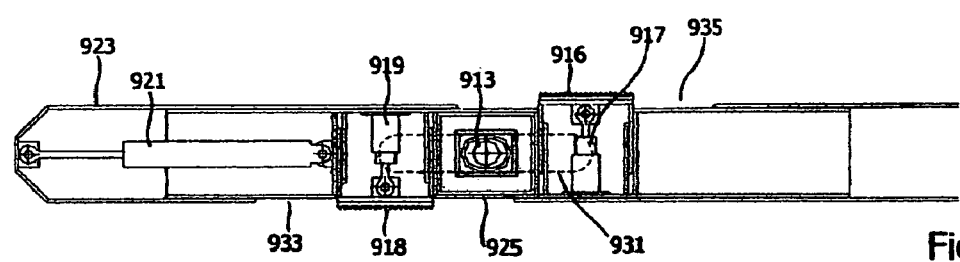
FIG. 5 is a cross sectional side view of one side of a self advancing shield of the present invention with gripping means extended creating resistance and the outer beam being pushed forward.
Figure 4:
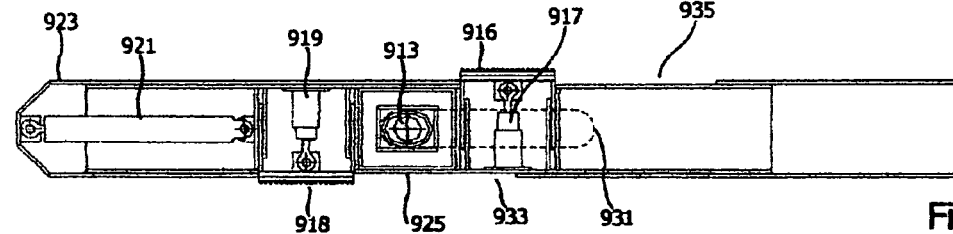
FIG. 4 is a cross sectional side view of one side of a self advancing shield of the present invention with gripping means extended.

FIG. 4 and FIG. 5 shows a preferred embodiment of the shield 145 of the present invention wherein the shield 145 comprises a self advancing shield 146. The self advancing shield 146 is preferably located at the forward end of a series of shields, closest to the miner. The self advancing shield 146 works in conjunction with a platform driver which pushes the system from outside the mine. The advantage of using a self advancing shield is that it prevents buckling of the system which could occur if the system was advanced by the platform alone. The self advancing shield 146 is adapted to surround mining machinery 300. Rollers 507 between the advancer shield 145 and the mining machinery 300 allow the mining machinery 300 to be pulled through the shield 145 structure and then out to an external platform in the event of a roof fall thus preventing entrapment of the mining machinery 300.

The self advancing shield 146 comprises at least two beams or tubes (box beams); one slightly smaller inner beam 925 slides independently within an outer beam 923. The outer beam 923 comprises the top surface 405 and side supports 401 of the shield 145. The inner beam 925 comprises actuating means 913, 917, 919 which act to press gripping means 911, 916, 918 into any combination of floor, roof, and sidewalls of the mine. The actuating means 913, 917, 919 are any actuating means known to those of average skill in the art, and are preferably hydraulic cylinders. When in an extended position, the actuating means 913, 917, 919 pass through openings 931, 933, 935 in the outer beam 923 and press the gripping means 911, 916, 918 into any combination of floor, roof, and sidewalls of the mine. The gripping means 911, 916, 918 are any gripping means known to those of skill in the art to grip a mine wall, and are preferably stab plates. When the gripping means 911, 916, 918 are engaging the mine, an advancing means 921 extends the outer beam 923. The advancing means is any advancing means known to those of average skill in the art and is preferably a hydraulic cylinder. The gripping means 911, 916, 918 are then withdrawn back through the openings 931, 933, 935 in the outer beam 923. The advancing means 921 is then retracted, pulling the shield 145 forward.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An apparatus for protecting remote mining machinery from roof falls comprising:
    a shield system comprising at least one shield, the shield having two side surfaces and a top surface, the side and top surfaces defining a cavity through which mining equipment can be moved into and out of a mine, wherein the shield is adapted to move into and out of the mine independently of the mining machinery, whereby the mining machinery is adapted to be withdrawn from the mine leaving the shield system in the mine in the event of a roof fall, wherein the mining machinery comprises at least one support means to support the top surface of the shield in the event of a roof fall.

2. The apparatus as set forth in claim 1 wherein the shield further comprises a bottom surface.

3. The apparatus as set forth in claim 1 wherein the cavity is adapted to protect the mining machinery from falling rocks.

4. The apparatus as set forth in claim 2 wherein the bottom surface of the shield incorporates wheels.

5. The apparatus as set forth in claim 1 wherein the shield further includes a means for connecting to a second shield.

6. The apparatus as set forth in claim 5 wherein the means for connecting the shield to the second shield is a hook and pin system.

7. The apparatus as set forth in claim 1 wherein at least one shield in the shield system comprises a self advancing shield.

8. An apparatus for protecting remote mining machinery from roof falls comprising:
    a shield system comprising at least one shield, the shield having two side surfaces and a top surface, the side and top surfaces defining a cavity through which mining equipment can be moved into and out of a mine, wherein the shield is adapted to move into and out of the mine independently of the mining machinery, whereby the mining machinery is adapted to be withdrawn from the mine leaving the shield system in the mine in the event of a roof fall; and
    wherein at least one shield in the shield system comprises a self advancing shield, wherein the self advancing shield comprises: an outer beam, wherein the outer beam comprises the top surface and side surfaces of the shield; an inner beam slidably disposed within the outer beam, and at least one advancing means for moving the outer beam in relation to the inner beam; and
    wherein the inner beam comprises at least one gripping means for engaging a wall of the mine, and at least one actuating means for actuating the gripping means, whereby the gripping means is extended through an opening disposed in the outer beam and onto the wall of the mine; and wherein the outer beam comprises an opening corresponding to each gripping means, wherein the opening is large enough to allow the outer beam to move in relation to the gripping means when the gripping means is extended through the opening in the outer beam.

9. The apparatus as set forth in claim 8 wherein the advancing means is a hydraulic cylinder.

10. The apparatus as set forth in claim 8 wherein the advancing means propels the outer beam as it extends and pulls the inner beam as it retracts.

11. The apparatus as set forth in claim 1 wherein the shields are adapted to be pushed into the mine simultaneously with the mining machinery, and wherein the shields and mining machinery are adapted to be driven into the mine by a single external platform/driver.

12. An apparatus for protecting remote mining machinery from roof falls comprising:
    a shield system comprising at least one shield, the shield having two side surfaces and a top surface, the side and top surfaces defining a cavity through which mining equipment can be moved into and out of a mine, wherein the shield is adapted to move into and out of the mine independently of the mining machinery, whereby the mining machinery is adapted to be withdrawn from the mine leaving the shield system in the mine in the event of a roof fall, wherein at least one shield in the shield system comprises:
a substantially rectangular steel outer shield comprising at least one outer beam; a steel inner beam slidably disposed within the outer beam; and at least one hydraulic cylinder for moving the outer beam with respect to the inner beam, whereby the hydraulic cylinder propels the outer beam as it extends and pulls the inner beam as it retracts; and wherein the inner beam comprises at least one gripping means for engaging a wall of a mine, and at least one actuating means for actuating the gripping means, said actuating means comprising at least one hydraulic cylinder, wherein an extending end of the actuating means comprises the gripping means, whereby the actuating means extends the gripping means through an opening disposed in the outer beam and onto the wall of the mine; and wherein the outer beam comprises an opening corresponding to each gripping means, wherein the opening is large enough to allow the outer beam to move in relation to the gripping means when the actuating means is extended through the opening in the outer beam.

13. The apparatus as set forth in claim 1 wherein the support means comprises wheel rollers supported by springs.

14. An apparatus for protecting remote mining machinery from roof falls comprising:
a shield system comprising at least one shield, the shield having two side surfaces and a top surface, the side and top surfaces defining a cavity through which mining equipment can be moved into and out of a mine, wherein the shield is adapted to move into and out of the mine independently of the mining machinery, whereby the mining machinery is adapted to be withdrawn from the mine leaving the shield system in the mine in the event of a roof fall, wherein the mining machinery comprises roller means to guide the mining equipment through the shield system.

15. A shield system for protecting remote mining machinery from roof falls comprising:
a plurality of shields, wherein each shield is substantially rectangular in cross section, each shield having two side surfaces, a top surface, and a bottom surface, wherein the side, top, and bottom surfaces define a space through which mining equipment can be moved into and out of a mine, wherein the shield is adapted to move into and out of the mine independently of the mining machinery; and
wherein the mining machinery comprises at least one support means to support the top surface of the shield in the event of a roof fall, wherein the support means comprises at least one roller supported by at least one spring, and wherein the top surface of the shield is adapted to be supported by the support means; and wherein the mining machinery further comprises rolling means to help guide the mining machinery through the shield system; and wherein at least one shield in the shield system is adapted to be connected to an adjacent shield in the shield system.

16. A method for remotely mining ores and minerals and for removing the mined ores and minerals from the mine, comprising the steps of:
i) advancing a miner into a mine;
ii) advancing a first shield into the mine which shield protects the sides and top of the miner and which allows the miner to advance and retreat independently from the shield;
iii) advancing a conveying system into the mine, which conveying system comprises supports to support the roof of a second shield;
iv) advancing the second shield into the mine which shield protects the sides and top of the conveying system and which allows the conveying system to advance and retreat independent of the second shield;
v) excavating material from the mine using the miner; and
vi) removing the excavated material from the mine using the conveying system.

17. The method set forth in claim 16, wherein the first and second shields are substantially rectangular in cross section, the shields having two side surfaces, a top surface, and a bottom surface, wherein the side, top, and bottom surfaces define a cavity through which mining equipment can be moved into and out of a mine, wherein the shields are adapted to move into and out of the mine independently of the mining machinery; and
wherein the conveying system supports comprises at least one roller supported by at least one spring, and wherein the top surface of the shield is adapted to be supported by the conveying system supports;
and wherein the mining machinery further comprises rolling means to help guide the mining machinery through the shield system.

18. The method set forth in claim 16 further comprising the steps of:
vii) connecting the first shield to the second shield;
viii) advancing an additional conveying system into the mine, which conveying system comprises supports to support the roof of an additional shield;
ix) attaching the additional shield to a shield forward of the additional shield;
x) advancing the additional shield into the mine which shield protects the sides and top of the additional conveying system and which allows the additional conveying system to advance and retreat independent of the second shield;
xi) repeating steps viii, ix, and x.

* * * * *